United States Patent
Saade et al.

(10) Patent No.: US 9,847,798 B2
(45) Date of Patent: Dec. 19, 2017

(54) METHOD FOR POLARITY BIT LINE ENCODING USING APERIODIC FRAMES

(71) Applicants: STMicroelectronics (Alps) SAS, Grenoble (FR); STMICROELECTRONICS (GRENOBLE 2) SAS, Grenoble (FR)

(72) Inventors: Julien Saade, Grenoble (FR); Abdelaziz Goulahsen, Coublevie (FR)

(73) Assignees: STMICROELECTRONICS (GRENOBLE 2) SAS, Grenoble (FR); STMICROELECTRONICS (ALPS) SAS, Grenoble (FR)

( * ) Notice: Subject to any disclaimer, the term of this patent is extended or adjusted under 35 U.S.C. 154(b) by 0 days.

(21) Appl. No.: 14/961,996

(22) Filed: Dec. 8, 2015

(65) Prior Publication Data

US 2016/0233896 A1  Aug. 11, 2016

(30) Foreign Application Priority Data

Feb. 5, 2015  (FR) ..................... 15 50912

(51) Int. Cl.
*H04L 27/00* (2006.01)
*H04B 1/04* (2006.01)
*G06F 13/42* (2006.01)
*H04L 25/49* (2006.01)

(52) U.S. Cl.
CPC .......... *H04B 1/04* (2013.01); *G06F 13/4282* (2013.01); *H04L 25/4908* (2013.01)

(58) Field of Classification Search
CPC .... G06F 13/4282; H04B 1/04; H04L 25/4908
See application file for complete search history.

(56) References Cited

U.S. PATENT DOCUMENTS

| | | | |
|---|---|---|---|
| 3,646,517 A | | 2/1972 | Waters et al. |
| 4,486,739 A | * | 12/1984 | Franaszek ........... H04L 25/4908 341/59 |
| 6,333,704 B1 | * | 12/2001 | Jung ....................... H03M 5/00 341/56 |
| 6,351,501 B1 | | 2/2002 | Murdock |
| 6,430,230 B1 | * | 8/2002 | Cunningham ...... H04L 25/4908 375/292 |
| 6,496,540 B1 | | 12/2002 | Widmer |
| 7,187,307 B1 | | 3/2007 | Schmidt et al. |
| 7,259,699 B1 | * | 8/2007 | Xue ..................... H03M 5/145 341/50 |
| 9,490,836 B2 | * | 11/2016 | Mendel ................. H03M 5/145 |

(Continued)

FOREIGN PATENT DOCUMENTS

| WO | 9209162 | 5/1992 |
|---|---|---|
| WO | 0243319 | 5/2002 |

*Primary Examiner* — Daniel Washburn
*Assistant Examiner* — Amneet Singh
(74) *Attorney, Agent, or Firm* — Slater Matsil, LLP

(57) ABSTRACT

The invention relates to a method for serial data transmission, comprising the steps consisting in computing the running disparity (RD) of a bit stream that is being transmitted; when the running disparity reaches a threshold (T), computing a point disparity on a subsequent frame (S) of the stream; if the point disparity has the same sign as the threshold, inverting the states of the bits of the frame in the transmitted bit stream; and inserting into the transmitted bit stream a polarity bit having a state signalling the inversion.

14 Claims, 3 Drawing Sheets

(56) References Cited

U.S. PATENT DOCUMENTS

| | | | |
|---|---|---|---|
| 2004/0083419 A1* | 4/2004 | Chiba | H03M 7/20 714/799 |
| 2012/0243636 A1 | 9/2012 | Yamagishi et al. | |

* cited by examiner

METHOD FOR POLARITY BIT LINE ENCODING USING APERIODIC FRAMES

FIELD OF THE INVENTION

The present disclosure relates to serial communication interfaces, notably to conditioning techniques that are implemented on a signal to be transmitted on the physical layer.

BACKGROUND

The transmission of a serial signal has a certain number of constraints that are imposed by the various serial interface standards. Among these constraints, attempts are made to insure that the clock can be recovered from the signal by the receiving circuit, and that the signal has a DC component that varies little around its mid-excursion. In more recent interfaces, where speeds can exceed 1 gigabit/s, the standards moreover require the signal to produce little electromagnetic interference.

To meet these constraints, various line encoding techniques are used, including 8b/10b code (Ethernet, SATA, FireWire, USB 3), 64b/67b code (Interlaken) and polarity bit codes of generic type Nb/(N+1)b. These techniques are sometimes associated with scrambling using pseudo-random noise in order to reduce electromagnetic interference (as for the USB 3 standard).

Line encoding can likewise be characterized by a parameter called running disparity (RD). Running disparity is the running difference between the number of bits at 1 and the number of bits at 0 for a transmission in progress. It can be seen as a counter that is incremented when the current bit is at 1 and decremented when the current bit is at 0. When the running disparity increases in terms of absolute value, the eye diagram of the transitions closes, increasing the risk of transmission errors. It is therefore desirable for the running disparity to be limited.

The 8b/10b code provides running disparity limited to ±3. This value, which is particularly low, is obtained in return for a loss of useful bandwidth of 25% (2 redundant bits for 8 useful bits). A polarity bit code of Nb/(N+1)b type has a disparity limited to ±(N+N/2) in return for a loss of useful bandwidth of 1/N. The 64b/67b code used in the Interlaken protocol is a variation of the 64b/65b code and has a running disparity limited to ±96.

Line encoding operations introduce a compromise to be defined between the decrease in running disparity and improvement in the use of bandwidth.

SUMMARY

The present disclosure generally provides a method for serial data transmission, comprising the steps of computing the running disparity of a bit stream that is being transmitted; when the running disparity reaches a threshold, computing a point disparity on a subsequent frame of the stream; if the point disparity has the same sign as the threshold, inverting the states of the bits of the frame in the transmitted bit stream; and inserting into the transmitted bit stream a polarity bit having a state signalling the inversion.

The polarity bit may be inserted after the frame. The frame may include an even number of bits and the method may then moreover comprise the steps of, if the point disparity has an opposite sign from that of the threshold, leaving the bits of the frame unchanged in the transmitted bit stream and inserting a polarity bit having a state signalling the absence of inversion; and, if the point disparity is zero, leaving the bits of the frame unchanged in the transmitted bit stream and omitting the insertion of a polarity bit.

The method may moreover comprise the steps of, if the number of consecutive bits in a first state in the transmitted bit stream reaches a second threshold, inserting the bit pair 01; and, if the number of consecutive bits in a second state in the transmitted bit stream reaches the second threshold, inserting the bit pair 10.

The method may comprise the step of applying scrambling to the bit stream before the step of computing the running disparity.

There is likewise provision for a method for serial data reception, comprising the steps of computing the running disparity of a bit stream that is being received; when the running disparity reaches a threshold, examining a subsequent polarity bit in the stream; if the polarity bit indicates inversion, inverting in the received bit stream the states of the bits of a frame following the bit for which the disparity threshold has been reached; and erasing the polarity bit of the received bit stream. The bit examined as a polarity bit may be situated after the frame.

The frame may include an even number of bits and the method may then moreover comprise the steps of, if the polarity bit indicates an absence of inversion, leaving the bits of the frame unchanged in a received bit stream and erasing the polarity bit; computing the point disparity on the frame; and, if the point disparity is zero, leaving the bits of the frame unchanged in the received bit stream.

The method may comprise, before the step of computing the running disparity, the step of, if the number of consecutive bits at 1 or at 0 in the bit stream that is being received reaches a second threshold, erasing the next two bits in the stream.

BRIEF DESCRIPTION OF THE DRAWINGS

Embodiments will be explained in the description that follows, which is provided in a nonlimiting fashion with reference to the appended figures, among which.

DETAILED DESCRIPTION

Line encoding operations are described below that, for a given limitation of the running disparity, statistically decrease the loss of bandwidth in relation to conventional codes.

The line encoding operations described below are inspired by polarity bit codes of Nb/(N+1)b type. According to a conventional polarity bit code, the bits of a transmission are organized into periodic frames of N+1 bits (N useful bits and one polarity bit). The polarity bit indicates to the receiving circuit that the states of the useful bits of the frame have been, or have not been, inverted. At the transmitter, a point disparity is computed on each frame. If the point disparity has the same sign as the running disparity, the states of the useful bits of the frame are inverted so that the resultant running disparity decreases in terms of absolute value. If the point disparity has the opposite sign, the useful bits of the frame are left unchanged.

In this way, a polarity bit is systematically inserted for every N bits, bringing about a loss of bandwidth of 1/N, in order to limit the running disparity to ±(N+N/2) in return.

Instead of organizing the bits into periodic frames, the bits are organized into aperiodic frames S. An aperiodic frame is defined each time the running disparity RD reaches a threshold T or −T. A point disparity is computed for each frame, and the states of the useful bits of the frame are inverted if the point disparity has the same sign as the threshold that is reached. This technique makes it possible to insure that the running disparity is limited in return for a loss of useful bandwidth that is statistically lower than that obtained with known equivalent line codes.

As for known codes, an aperiodic frame code can operate on raw data or on data scrambled by pseudo-random noise.

Figure 1:
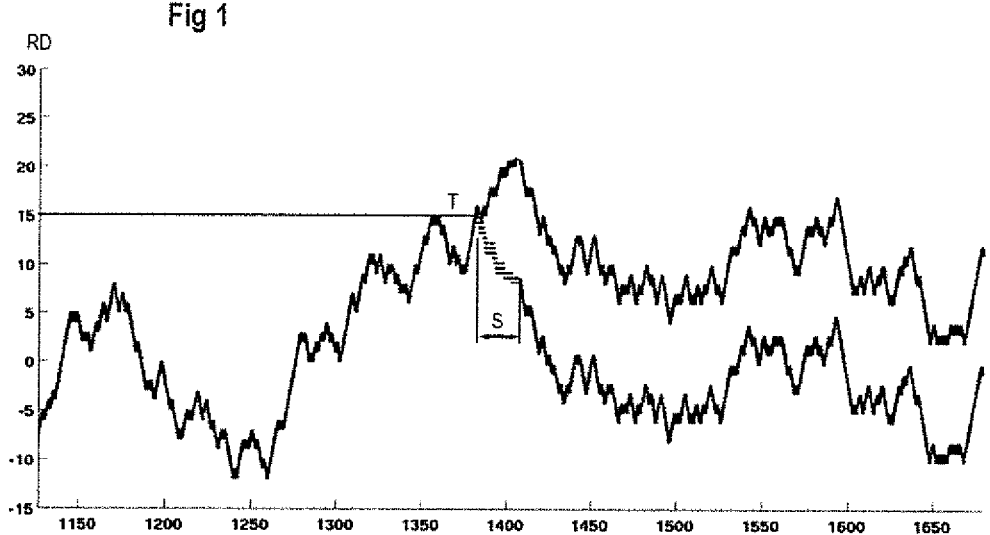
FIG. 1 illustrates an example of the course of the running disparity of a transmission and a disparity-limiting operation implemented according to the invention.

FIG. 1 illustrates an example of the course of the running disparity RD of a transmission and the effect of inversion of an aperiodic frame S on this disparity. The threshold T is equal to 15, for example, and it is reached by the running disparity between bits 1350 and 1400. Without any action on the bit stream transmitted in this example, the running disparity would continue to increase so as to exceed the value 20, as is illustrated around bit 1400.

When the threshold T is reached, the next bits are organized in a frame S of fixed size. The point disparity computed on the frame S is positive in this case, having the same sign as the threshold T, and brings about inversion of the states of the bits of the frame S in the transmission in progress. The result of this is that the progression of the running disparity is inverted after the threshold for the duration of the frame S, as shown in a broken line. After the frame S, the bits readopt the states of the original transmission, and the running disparity follows its normal course, but below the threshold T.

Figure 2A:
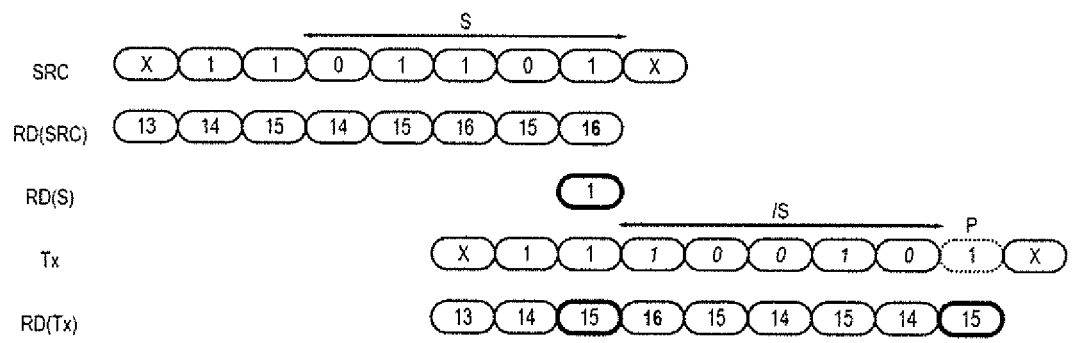
FIGS. 2A to 2C are timing diagrams illustrating three instances of application of a code example according to the invention.
Figure 2B:
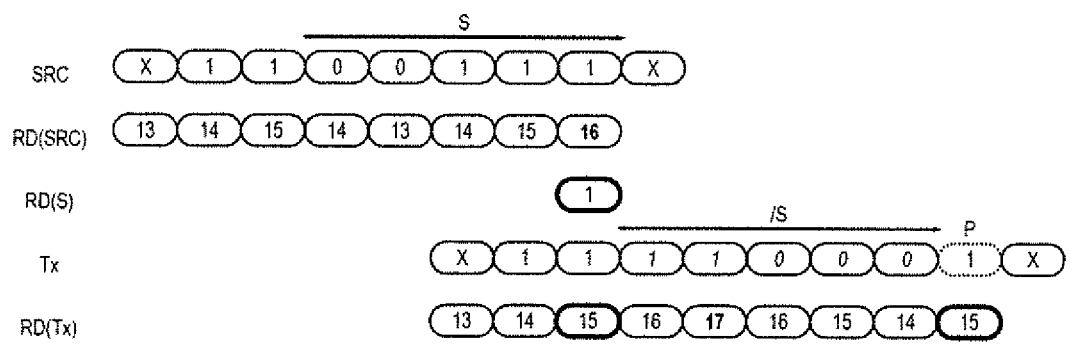
Figure 2C:
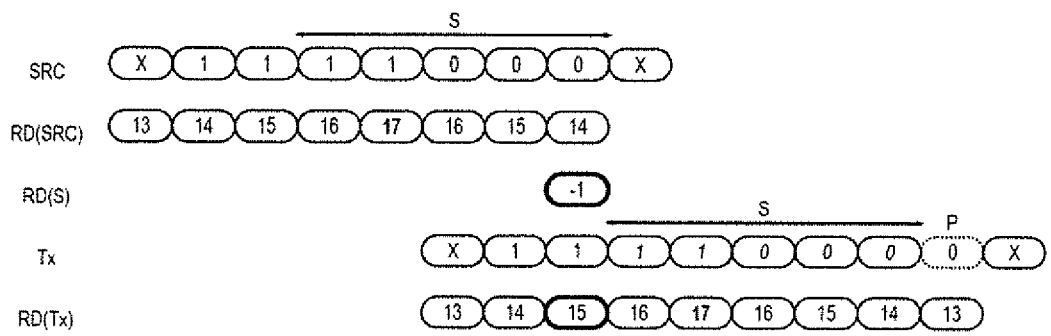

FIGS. 2A to 2C are timing diagrams illustrating more specifically three instances of application of an aperiodic frame code example. In this example, the code has the parameters T=15 and S=5 useful bits, a code that will be denoted by T15/S5. By defining a value T, a pair of thresholds (+T, −T) is defined, since the running disparity is a signed value that may require limiting symmetrically.

These figures illustrate an example of the course of a source bit stream SRC to be transmitted, the running disparity RD(SRC) of the stream SRC, the point disparity RD(S) computed on the frame S, the resultant transmitted bit stream Tx and the effective running disparity RD(Tx) of the transmitted stream. The transmitted stream Tx is delayed in relation to the incoming stream SRC by the size of a frame S, as is shown, since the decision to invert the frame in the transmitted frame is based on a computation (the point disparity) involving the whole frame. The running disparity used for threshold detections is that RD(Tx) of the transmitted stream.

In FIG. 2A, the stream Tx is such that the running disparity RD(Tx) reaches the threshold T=15 at the third bit shown. This event, which is marked in bold, triggers the definition of a frame S including the last five received bits of the stream SRC, and the computation of the point disparity RD(S) for this frame S. The frame can be stored in a five-bit shift register receiving the stream SRC and producing the stream Tx. The point disparity RD(S) can then be computed in one cycle from the bits of the register.

The bits of the frame S are 01101, for example, producing RD(S)=1. In this way, the point disparity has the same sign as the threshold T=15. This results in the states of the bits of the frame S being inverted in the transmitted stream Tx, in an inverted frame denoted by /S.

A polarity bit P is inserted into the transmitted stream following the frame /S in order to indicate the polarity of the frame to the receiving circuit. The negative polarity, indicating inversion, is identified by the state 1 of the bit P, for example. The bit P could likewise be inserted before the frame, but this can have a disadvantage that is explained later on.

The running disparity of the transmitted stream RD(Tx) takes account of the polarity bits. This disparity can fluctuate around the value T=15 several times during the transmission of the frame, as in this example. During the transmission of the frame, threshold detection is inhibited. Threshold detection can be reactivated from the polarity bit P. So, in this example, a new threshold detection, which is marked by a bold surround, occurs at the polarity bit, since the running disparity RD(Tx) then reaches the value 15.

The running disparity RD(Tx) of the transmitted stream Tx reaches the peak value 16 at the beginning of the inverted frame /S and reaches the value 14 at the end of the frame. Without inversion, the running disparity would reach the value 16 at the end of the frame. In this example, the inversion of the frame allows the running disparity to be lowered by two points. Since the polarity bit P is part of the transmitted stream, the effective running disparity ends at the value 15.

In this example, the gain obtained by the inversion of the frame S is just one point, but this reflects the fact that the number of ones in the frame S that is taken as an example is greater than the number of zeros of just one unit. In the best case, the frame S has all of its bits at 1. The gain is then at 9 points, taking account of the polarity bit.

It is noted that the value 1 of the polarity bit P in this case contributes to reducing the gain by one unit. This loss is suffered only by the positive threshold +T. It is compensated for when the running disparity reaches the negative threshold −T, where the value 1 of the polarity bit increases the gain by one unit. A symmetrical effect would be obtained by choosing the state 0 to indicate inversion using the polarity bit.

As can be seen in FIG. 2A, the running disparity of the transmitted stream Tx exceeds the threshold T=15. The running disparity is not completely limited to ±T.

FIGS. 2B and 2C illustrate worst cases of the threshold T being exceeded for the code T15/S5. The worst case, for a positive threshold, is obtained when the frame used in the transmitter stream Tx has the greatest possible number of consecutive ones at its beginning. This number is, generally, the whole portion of S/2, or 2 for S=5 in this example. The reason is that the number of ones cannot be greater, because otherwise the sign of the point disparity is inverted and it is the inverse frame that is used, which has two ones at most.

The frame S in FIG. 2B contains the bits 00111, for example. The point disparity of this frame is positive, so that the inverted frame /S, the sequence 11000, is used in the transmitted stream Tx. The frame /S has two consecutive ones at its beginning, so that the running disparity RD(Tx) reaches 17 at the second bit of this frame.

If the frame S had been 00011, it would not have been inverted.

The frame S in FIG. 2C contains the bits 11000, for example. The point disparity of this frame is negative, so that the frame S is used as it is in the transmitted stream Tx. The polarity bit P is 0. The frame S has two consecutive ones at its beginning, so that the running disparity RD(Tx) reaches 17 at the second bit of this frame.

A symmetrical behaviour is obtained at the negative threshold −T, considering the number of consecutive zeros at the beginning of the frame that is used in the transmitted stream Tx.

These developments result in the running disparity of the transmitter stream Tx being limited to ±(T+S/2), where S/2 is the integer division of S by 2.

As has been indicated previously, the polarity bit P can, according to one alternative, be inserted before the frame in the transmitted stream. In the example of FIG. 2B, there would be three consecutive ones after the threshold detection, which would increase the limits of the running disparity by one point.

Figure 3:
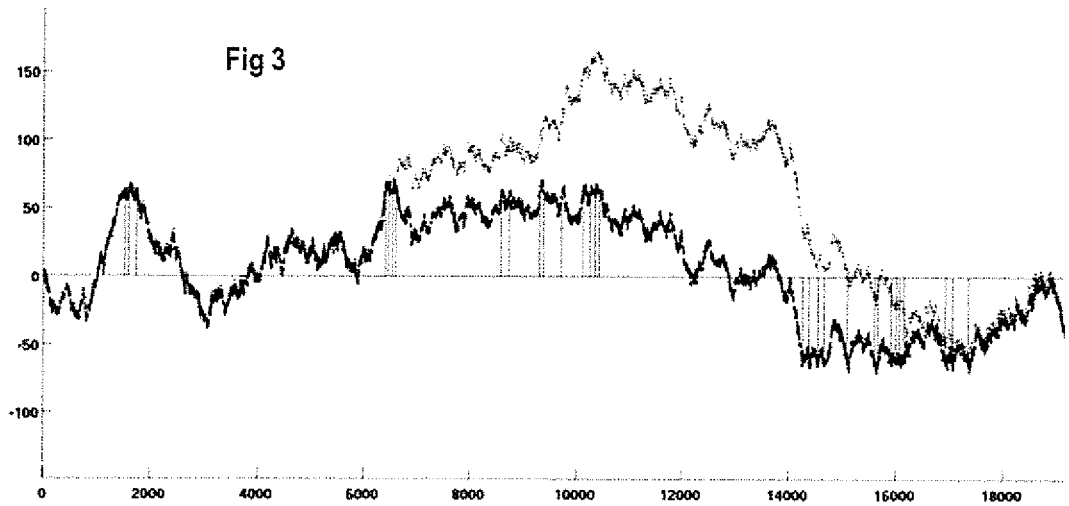
FIG. 3 illustrates an example of the course of the running disparity of a transmission and the corresponding limited course obtained with a code example according to the invention.

FIG. 3 illustrates the courses of two running disparities compared on a transmission of a random sample of 20,000 bits. One of the disparities, shown as a solid line, is the disparity obtained by using a code T64/S63 (i.e., an aperiodic frame code having parameters T=64 and S=63). The second disparity, which is shown as a broken line for the different portions, is the running disparity of the original bit stream.

This T64/S63 code limits the running disparity to ±95. The vertical lines illustrate the threshold detections that take place during the transmission.

The loss of bandwidth that is brought about by an aperiodic frame code is dependent on the frequency of the threshold detections, since each threshold detection brings about the insertion of a polarity bit. In the worst case, the frames S are consecutive, so that there is a move closer to a conventional Nb/(N+1)b code where N=S. This worst case is not very likely, however. The loss of bandwidth is statistically between 0 and 1/S. Simulations performed with random data and a T64/S63 code show a loss of 0.14%, well below the worst-case loss of 1/63=1.6%.

In the examples above, it has been assumed that the frames S had an uneven number of bits. The point disparity of such frames is never zero, so that the inversion decision is unambiguously concerned with the sign of the disparity.

Frames S having an even number of bits are contemplated below. In this case, the point disparity of each frame may be positive, negative or zero. The instances of positive and negative point disparities are handled in the same way as for frames having an uneven number of bits, by systematically inserting a polarity bit into the transmitted stream. By contrast, when the point disparity is zero, the frame is transmitted unchanged and no polarity bit is inserted into the transmitted stream.

Figure 4A:
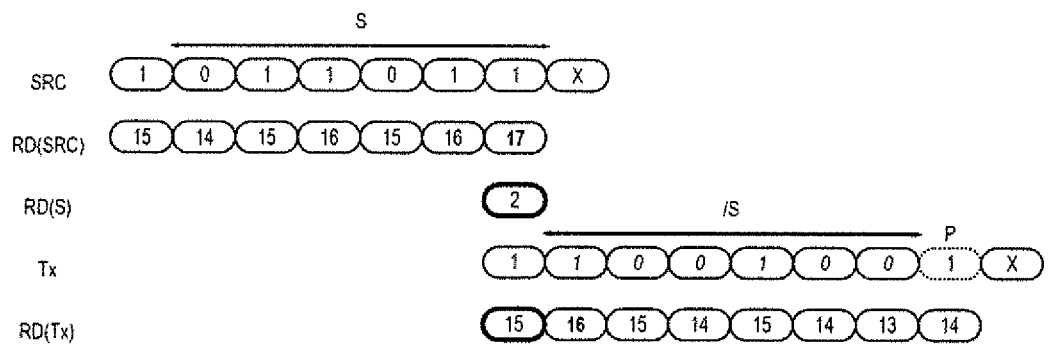
FIGS. 4A and 4B are timing diagrams illustrating two instances of application of another code example according to the invention.
Figure 4B:
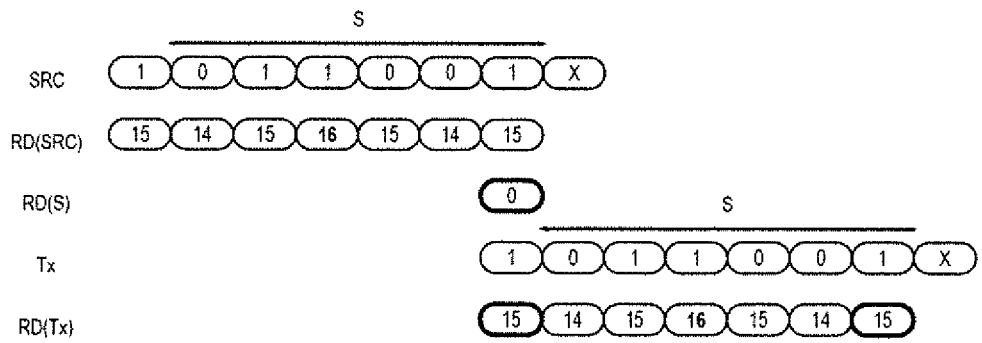

FIGS. 4A and 4B are timing diagrams illustrating two instances of application of a T15/S6 code example, using frames S having an even number of bits.

In FIG. 4A, when the running disparity RD(Tx) of the transmitted stream reaches the threshold T=15, the frame S contains the bits 011011. The point disparity of this frame is 2, bringing about inversion of the frame in the transmitted stream, and addition of a polarity bit P that is 1.

In FIG. 4B, when the running disparity RD(Tx) of the transmitted stream reaches the threshold T=15, the frame S contains the bits 011010. The point disparity of this frame is 0. The frame is preserved as it is in the transmitted stream, and no polarity bit P is added.

A frame having a zero point disparity does not modify the value of the running disparity. Thus, the running disparity reaches the threshold T again at the last bit of the frame, as is shown. In this case, it is preferable to reactivate threshold detection from the last bit of the frame, as is indicated by a bold surround.

The number of combinations leading to zero disparity in a frame having an even number of bits, i.e., the number of combinations where the number of bits at 1 in the frame is equal to the number of bits at 0, is in the order of a third of the possible combinations. Thus, the loss of bandwidth is statistically reduced by one third in relation to a code using frames having an uneven number of bits.

Simulations performed with random data for a T64/564 code, the even counterpart of the T64/S63 code used in FIG. 3, show a loss of useful bandwidth on the order of 0.11%. This loss is in fact lower than that produced by the T64/S63 code. The T64/S64 code, limiting the running disparity to ±96, is equivalent to the 64b/65b code used in the Interlaken protocol, but the loss of bandwidth is more than ten times lower.

If there is a requirement to limit the running disparity to ±3, as is done by the 8b/10b code, the aperiodic frame code T2/S2 can be used. The T2/S2 code statistically brings about a loss of bandwidth on the order of 14.3%, which is better than the 25% of the 8b/10b code.

Figure 5:
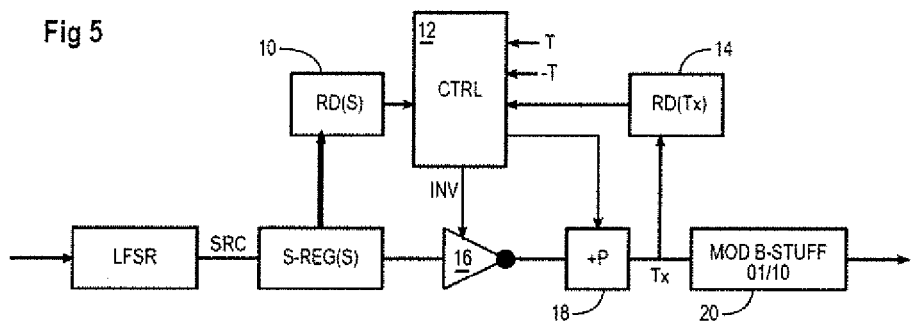
FIG. 5 is a block diagram of an embodiment of a transmitting circuit implementing a code according to the invention.

FIG. 5 is a block diagram of an embodiment of a transmission-end conditioning circuit that can implement aperiodic frame coding. The data to be transmitted can be scrambled beforehand by a linear feedback shift register LFSR. The register LFSR then produces the source stream SRC to which the coding is applied. The stream SRC is introduced into an S-bit shift register S-REG that is used to store the frames S pending an inversion decision. A circuit 10 computes the point disparity of the content of the register S-REG and supplies the result RD(S) to a control circuit 12. The circuit 12 furthermore receives the thresholds ±T and the running disparity RD(Tx) computed by a circuit 14 on the transmitted bit stream Tx. The stream Tx arrives from the register S-REG through a controlled inverter 16 and a polarity bit insertion circuit 18.

Initially, the inverter 16 and the circuit 18 are controlled to be transparent, so that the stream Tx corresponds directly to the output of the register S-REG. When the running disparity RD(Tx) reaches one of the thresholds ±T, the current content of the register S-REG defines a frame S. The control circuit compares the sign of the point disparity RD(S) produced by the circuit 10 with the sign of the threshold that is reached.

If the signs are the same, the controlled inverter 16 is put into an inverting mode and the circuit 18 is configured to insert the polarity bit 1 behind the frame S extracted from the register S-REG.

If the signs are opposite, the controlled inverter 16 is put into a transparent mode and the circuit 18 is controlled to insert the polarity bit 0 behind the frame S extracted from the register S-REG.

Finally, if the disparity RD(S) is zero, the controlled inverter 16 and the circuit 18 are put into transparent mode.

As is shown, in some applications it is possible to provide for a stuffing bit insertion circuit 20 in the transmitted stream Tx. Such a circuit conventionally has the role of breaking excessively long sequences of consecutive bits in the same state, by inserting a transition when the number of consecutive bits in the same state reaches a threshold. This facilitates clock recovery for the receiver.

However, the insertion of stuffing bits in a conventional fashion in the stream Tx is incompatible with limiting the running disparity of the stream Tx. In order to resolve this incompatibility, it is proposed that a pair of stuffing bits in opposite states be inserted for each stuffing bit that a conventional circuit would have inserted. By way of example, where a conventional circuit would have inserted the bit 1 following a series of zeros, the modified circuit 20 inserts the pair of bits 10, and where the conventional circuit would have inserted the bit 0 following a series of ones, the modified circuit 20 inserts the pair of bits 01. Each pair of inserted bits of this type has no effect on the running disparity, since the second bit compensates for the first.

Figure 6:
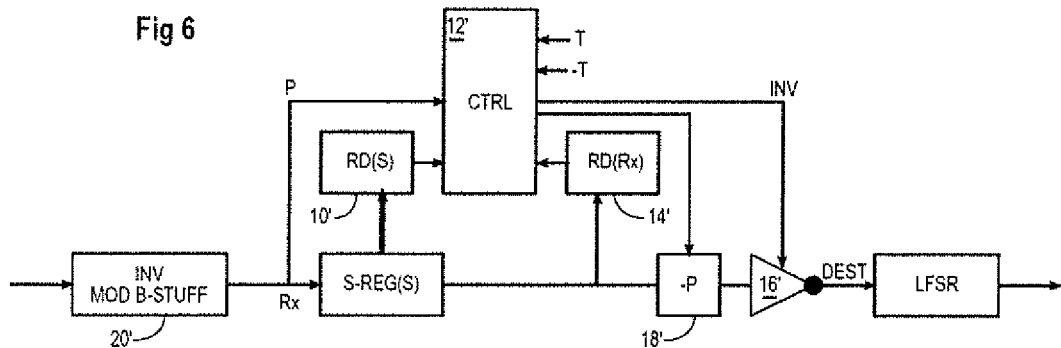
FIG. 6 is a block diagram of an embodiment of a receiving circuit implementing a code according to the invention.

FIG. 6 is a block diagram of an embodiment of a reception-end conditioning circuit that is able to implement the decoding of an aperiodic frame code. If the transmission circuit is provided with a stuffing bit insertion circuit 20, the reception circuit is preceded by a circuit 20' but is designed to remove the stuffing bits, and more specifically, the pairs of stuffing bits.

The incoming bit stream Rx, provided where necessary by the circuit 20', is introduced into an S-bit shift register S-REG that is used to store the frames S that need to have their polarity restored. A circuit 10' computes the point disparity of the content of the register S-REG and supplies the result RD(S) to a control circuit 12'. The circuit 12' furthermore receives the thresholds ±T, the polarity bit P taken from the stream Rx and the running disparity RD(Rx) computed by a circuit 14' on the stream of received bits Rx, which is delayed by one frame by the register S-REG. The restored bit stream DEST arrives from the register S-REG through a polarity bit erasure circuit 18' and a controlled inverter 16'.

Initially, the inverter 16' and the circuit 18' are controlled to be transparent, so that the stream DEST corresponds directly to the output of the register S-REG. When the running disparity RD(Rx) reaches one of the thresholds ±T, the register S-REG contains a frame S and the current bit of the stream Rx is the corresponding polarity bit P.

If the frames have an uneven number of bits, the circuit 10' is not used. The polarity bit P indicates directly to the control circuit 12' the mode to be chosen for the inverter 16' during the extraction of the frame S from the register S-REG. Once the frame has been extracted, the circuit 18' is controlled to erase the parity bit arriving behind the frame.

If the number of bits in the frames is even, on threshold detection, the control circuit moreover checks the point disparity RO(S) produced by the circuit 10', If it is zero, there is no parity bit and the circuits 16' and 18' are left in a transparent mode until the next threshold detection.

Numerous variations and applications of the aperiodic frame line encoding operations described here will become apparent to a person skilled in the art. Particular examples of values for T and S have been indicated by way of illustration. Of course, the values of T and S are not limited to these examples, and a person skilled in the art will be able to use other values to adapt the codes to other applications.

The invention claimed is:

1. A method for serial data transmission comprising:
   computing a running disparity of a bit stream being transmitted, with bits of the bit stream being organized into frames;
   when the running disparity reaches a threshold, computing a point disparity on a subsequent frame in the transmitted bit stream, the subsequent frame including an even number of bits;
   if the point disparity has a same sign as the threshold, inverting states of the bits of the subsequent frame in the transmitted bit stream and inserting into the transmitted bit stream a polarity bit having a state signalling the inversion;
   if the point disparity has an opposite sign from that of the threshold, leaving the bits of the frame unchanged in the transmitted bit stream and inserting a polarity bit having a state signalling an absence of inversion; and
   if the point disparity is zero, leaving the bits of the subsequent frame unchanged in the transmitted bit stream and omitting the insertion of the polarity bit.

2. The method according to claim 1, wherein the polarity bit is inserted after the subsequent frame.

3. The method according to claim 1, further comprising:
   if a number of consecutive bits in a first state in the transmitted bit stream reaches a second threshold, inserting the bit pair 01; and
   if a number of consecutive bits in a second state in the transmitted bit stream reaches the second threshold, inserting the bit pair 10.

4. The method according to claim 1, further comprising scrambling the bit stream before computing the running disparity.

5. A method for serial data reception comprising:
   computing a running disparity of a bit stream that is being received, with bits of the bit stream being organized into frames;
   when the running disparity reaches a threshold, examining a subsequent polarity bit in the received bit stream;
   if the polarity bit indicates inversion, inverting in the received bit stream states of the bits of a frame following the bit for which the disparity threshold has been reached and
   erasing the polarity bit of the received bit stream; and
   erasing the next two bits in the bit stream, before computing the running disparity, if a number of consecutive 1 or 0 bits in the bit stream reaches a second threshold.

6. The method according to claim 5, wherein the bit examined as the polarity bit is located after the frame.

7. The method according to claim 5, wherein the frame includes an even number of bits, and the method further comprises:
   if the polarity bit indicates an absence of inversion, then leaving the bits of the frame unchanged in a received bit stream and erasing the polarity bit;
   computing the point disparity on the frame;
   if the point disparity is zero, then leaving the bits of the frame unchanged in the received bit stream.

8. An electronic device comprising:
   a running disparity circuit configured to compute a running disparity of a bit stream being transmitted, with bits of the bit stream being organized into frames;
   a point disparity circuit configured to compute a point disparity on a subsequent frame in the transmitted bit stream when the running disparity reaches a threshold;
   an inverter coupled to said running disparity circuit and to said point disparity circuit and configured to invert states of the bits of the subsequent frame in the transmitted bit stream if the point disparity has a same sign as the threshold; and
   an insert circuit coupled downstream to said inverter and configured to insert into the transmitted bit stream a polarity bit having a state signalling the inversion, the insert circuit being further configured to insert the bit pair 01 in response to a number of consecutive bits in a first state in the transmitted bit stream reaching a second threshold, and to insert the bit pair 10 in response to a number of consecutive bits in a second state in the transmitted bit stream reaching the second threshold.

9. The electronic device according to claim 8, wherein said insert circuit is configured to insert the polarity bit after the subsequent frame.

10. The electronic device according to claim 8, wherein the insert circuit frame includes an even number of bits, and wherein said insert circuit is further configured to:
  if the point disparity has an opposite sign from that of the threshold, leaving the bits of the subsequent frame unchanged in the transmitted bit stream and inserting a polarity bit having a state signalling an absence of inversion; and
  if the point disparity is zero, leaving the bits of the subsequent frame unchanged in the transmitted bit stream and omitting the insertion of the polarity bit.

11. The electronic device according to claim 8, further comprising a shift register upstream to said running disparity circuit and configured to scramble the bit stream before computing the running disparity.

12. An electronic device comprising:
  a running disparity circuit configured to compute a running disparity of a bit stream that is being received, with bits of the bit stream being organized into frames;
  a control circuit coupled to said running disparity circuit and configured to examine a subsequent polarity bit in the received bit stream when the running disparity reaches a threshold;
  an inverter coupled to said control circuit and configured to invert in the received bit stream states of the bits of a frame following the bit for which the disparity threshold has been reached if the polarity bit indicates inversion; and
  a polarity bit erase circuit coupled to said control circuit and downstream to said inverter and configured to erase the polarity bit of the received bit stream, the polarity bit erase circuit being further configured to erase, before computing the running disparity, a next two bits in the bit stream if a number of consecutive 1 or 0 bits in the bit stream reaches a second threshold.

13. The electronic device according to claim 12, wherein the bit examined as the polarity bit is located after the frame.

14. The electronic device according to claim 12, wherein the frame includes an even number of bits, wherein said polarity bit erase circuit is further configured to leave the bits of the frame unchanged in the received bit stream and erasing the polarity bit if the polarity bit indicates an absence of inversion, and further comprising:
  a point disparity circuit coupled to said control circuit and configured to compute the point disparity on the frame;
  wherein said control circuit is further configured to leave the bits of the frame unchanged in the received bit stream if the point disparity is zero.

* * * * *